(12) United States Patent
Hagenbuch (10) Patent No.: US 6,796,602 B2
(45) Date of Patent: *Sep. 28, 2004

(54) TAILGATE ASSEMBLY FOR HEAVY DUTY OFF-ROAD TRUCKS

(76) Inventor: LeRoy G. Hagenbuch, 502 W. Northgate Rd., Peoria, IL (US) 61614

(*) Notice: Subject to any disclaimer, the term of this patent is extended or adjusted under 35 U.S.C. 154(b) by 0 days.

This patent is subject to a terminal disclaimer.

(21) Appl. No.: 10/364,248

(22) Filed: Feb. 11, 2003

(65) Prior Publication Data

US 2003/0168885 A1 Sep. 11, 2003

Related U.S. Application Data

(63) Continuation-in-part of application No. 09/879,559, filed on Jun. 12, 2001, now Pat. No. 6,517,143.

(51) Int. Cl.⁷ .................................................. B60P 1/26
(52) U.S. Cl. ................. 296/186.3; 296/186.4; 296/56; 298/23 D; 298/23 DF
(58) Field of Search .................... 296/183.2, 186.3, 296/186.4, 184, 50, 56; 298/23 MD, 23 D, 23 DF, 23 R (56) References Cited

U.S. PATENT DOCUMENTS

| | | | | |
|---|---|---|---|---|
| 1,481,538 A | * | 1/1924 | Crooke | 298/14 |
| 1,792,680 A | * | 2/1931 | Dewey | 298/23 R |
| 1,940,025 A | * | 12/1933 | Silva | 298/23 D |
| 3,272,552 A | * | 9/1966 | Park | 296/56 |
| 3,720,446 A | * | 3/1973 | Kelley | 298/22 R |
| 3,751,112 A | * | 8/1973 | Hagenbuch | 298/23 DF |
| 3,905,493 A | * | 9/1975 | Logue | 414/541 |
| 3,905,616 A | * | 9/1975 | Tamburino et al. | 280/851 |
| 3,917,343 A | * | 11/1975 | Taylor et al. | 298/23 DF |
| 4,050,734 A | * | 9/1977 | Richard | 296/98 |
| 4,071,277 A | * | 1/1978 | Stedman | 298/22 P |
| 4,323,279 A | * | 4/1982 | Domes et al. | 298/23 DF |
| 4,348,055 A | * | 9/1982 | Meisner et al. | 298/23 DF |
| 4,531,781 A | * | 7/1985 | Hunt et al. | 298/22 P |
| 4,621,858 A | * | 11/1986 | Hagenbuch | 296/56 |
| 4,678,235 A | * | 7/1987 | Hagenbuch | 298/23 DF |
| 5,100,279 A | * | 3/1992 | Bjerk | 414/421 |
| 5,174,632 A | * | 12/1992 | Hagenbuch et al. | 298/23 MD |
| 5,228,750 A | * | 7/1993 | Hagenbuch | 298/1 B |
| 5,887,914 A | * | 3/1999 | Hagenbuch | 298/23 R |

FOREIGN PATENT DOCUMENTS

| | | | |
|---|---|---|---|
| CH | 98789 | * | 4/1940 |
| DE | 913876 | * | 5/1954 |
| DE | 39706 | * | 6/1965 |
| GB | 164658 | * | 6/1921 |
| GB | 595516 | * | 12/1947 |

* cited by examiner

Primary Examiner—Patricia L. Engle
(74) Attorney, Agent, or Firm—Leydig, Voit & Mayer, Ltd.

(57) ABSTRACT

A tailgate assembly for a dump body is provided. The dump body has a pair of opposing sidewalls and an open rear end. The dump body is movable relative between a lowered transport position and a raised dump position. The tailgate assembly including a pair of opposing sidearms each of which is pivotally connected to a respective sidewall of the dump body and a center-rear portion supported between the sidearms. The sidearms and center-rear portion are movable between a closed position wherein the center-rear portion spans substantially between the opposing sidewalls of the dump body and encloses the open rear end of the dump body and an open position wherein the center-rear portion is positioned away from the open rear end of the dump body. Each of the sidearms includes an extended portion at an end thereof. The extended portions are curved inwardly toward each other in overlapping relation to at least a portion of the center-rear portion. The extended portions are connected to the center-rear portion.

21 Claims, 14 Drawing Sheets

TAILGATE ASSEMBLY FOR HEAVY DUTY OFF-ROAD TRUCKS

CROSS-REFERENCE TO RELATED PATENT APPLICATION

This patent application is a continuation in part of U.S. patent application Ser. No. 09/879,559, filed Jun. 12, 2001 now U.S. Pat. No. 6,517,143.

FIELD OF THE INVENTION

This invention relates to heavy-duty off-road trucks and, more particularly, to a tailgate assembly for these trucks.

BACKGROUND OF THE INVENTION

The dump bodies of heavy-duty, off-road trucks are often provided with tailgate assemblies in order to increase their load capacity. A tailgate assembly typically includes a pair of straight sidearms which are pivotally mounted to the sides of the dump body and between which a center-rear portion is supported. When the tailgate assembly is in a closed position, the center-rear portion closes off the rear end of the dump body. Thus, when the tailgate assembly is closed, the effective volumetric capacity of the dump body is increased as material is prevented from spilling out of the rear of the dump body. Such tailgate assemblies are subjected to a significant amount of punishment and thus must have a strong and durable design. One way in which this is accomplished is by welding reinforcing structures onto the sidearms and center-rear portion. As will be appreciated, however, this is a very time-consuming process.

Another area of concern with respect to the strength of the tailgate assembly is the connections between the sidearms and the center-rear portion. There are two different ways in which the center-rear portion is connected to the sidearms. Specifically, according to a first connection method, each end of the center-rear portion butts up against the inside surface of a respective one of the sidearms. Typically, a flange is provided on each end of the center-rear portion which extends along the inside surface of the respective sidearm. The center-rear portion is secured at either end to the arms by bolts which extend through the respective sidearm and flange in a direction parallel to the center-rear portion and perpendicular to the sidearm. Alternatively, the center-rear portion is secured at either end to the sidearms by welding.

With the other connection method, the arrangement of the center-rear portion and the sidearms is reversed. In particular, the inside surface of the center-rear portion butts up against the ends of the sidearms. A flange is provided on the end of each sidearm that extends along the inside surface of the center-rear portion. The center-rear portion is secured to the sidearms by bolts which extend through the center-rear portion and the flanges in a direction parallel to the sidearms and perpendicular to the center-rear portion or by welding this joint.

A significant drawback with both of these bolted, or in some cases welded, connection arrangements is that the connections compromise the durability of the tailgate assembly. Specifically, during loading of the dump body and when the truck is travelling up an incline, the load material frequently rolls or slides against the center-rear portion of the tailgate assembly, subjecting it to a significant amount of punishment. By virtue of their arrangement, the nuts and bolts used to connect the center-rear portion to the sidearms or the welded joints are responsible for transmitting the forces applied against the center-rear portion to the sidearms. Unfortunately, the nuts and bolts and/or the welding of the connection are/is ill equipped to perform this task as they have difficulty withstanding the forces involved. As a result, the center-rear portion is susceptible to becoming separated from the sidearms after repeated use necessitating costly repairs or even replacement.

Another drawback with the first connection arrangement is that it makes it difficult to compensate for any variations in width between the center-rear portion and the dump body. If the center-rear portion is not precisely matched to the width of the dump body, shims must be used at the connections between the center-rear portion and the sidearms. Fabricating and assembling these shims, can make the assembly process significantly more time consuming and difficult.

Moreover, as a result of the need to use flanges on the ends of either the sidearms or center-rear portion, it can be difficult to fit the bottom edge of the center-rear portion tightly against the rear end of the floor of the dump body when using the conventional connection arrangements while still providing the needed clearance for operation of the tailgate. Thus, a gap frequently exists between the bottom edge of the center-rear portion and the rear end of the floor of the dump body through which the load material can spill.

OBJECTS OF THE INVENTION

Accordingly, in view of the foregoing, a general object of the present invention is to provide a tailgate assembly for a heavy-duty, off-road truck which is stronger and more durable than tailgate assemblies that are presently commercially available.

Another object of one embodiment of the present invention is to provide a tailgate assembly for a heavy-duty, off-road truck which can be readily adjusted to compensate for variations in width between the center-rear portion and the dump body and which provides a tight fit between the bottom edge of the center-rear portion and the rear of the dump body floor.

Another object of one embodiment of the present invention is to provide a tailgate assembly for a heavy-duty, off-road truck which is less time-consuming to manufacture and easier to assemble to a dump body.

These and other features and advantages of the invention will be more readily apparent upon reading the following description of an exemplary embodiment of the present invention and upon reference to the accompanying drawings wherein:

While the invention will be described and disclosed in connection with certain exemplary embodiments, it is not intended to limit the invention to those specific embodiments. Rather it is intended to cover all such alternative embodiments and modifications as fall within the scope of the invention.

DETAILED DESCRIPTION OF THE INVENTION

Figure 1:
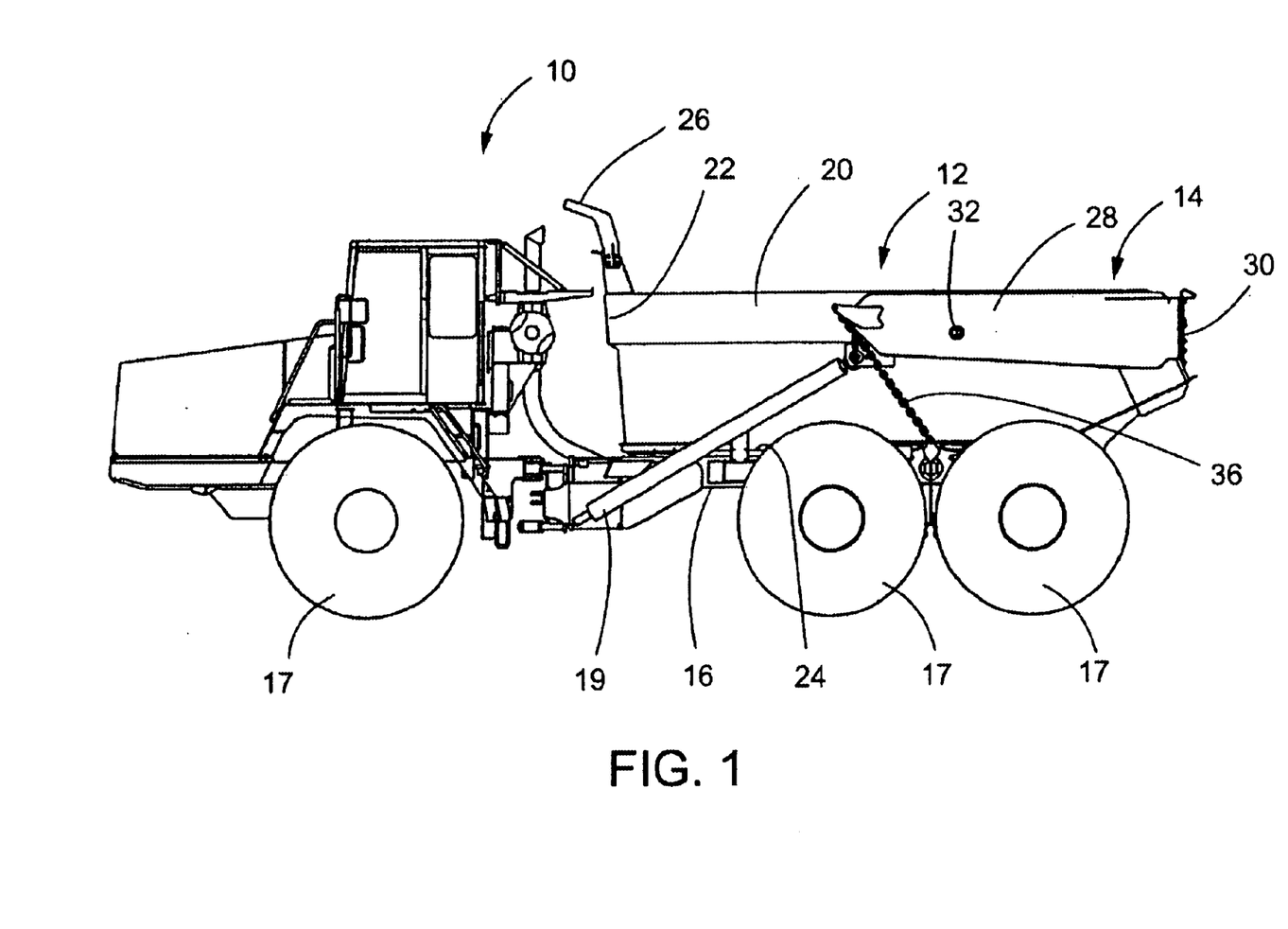
FIG. 1 is a side elevation view of a heavy-duty, off-road truck showing the dump body in the lowered position and an illustrative tailgate assembly constructed in accordance with the present invention in the closed position.
Figure 2:
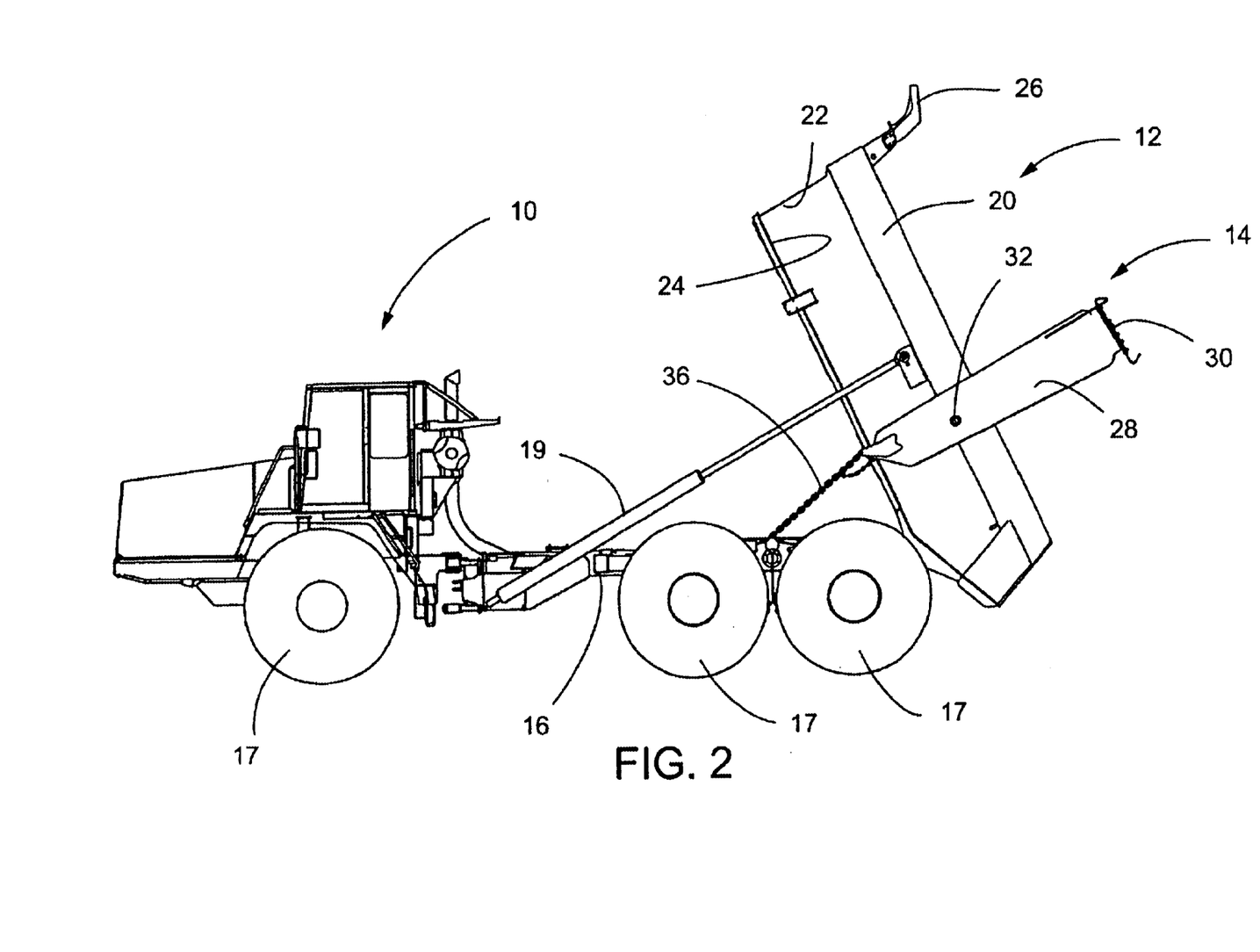
FIG. 2 is a side elevation view of the heavy-duty, off-road truck and tailgate assembly of FIG. 1 showing the dump body in the raised position and the tailgate assembly in the open position.

Referring now more particularly to FIGS. 1 and 2, an exemplary heavy-duty, off-road truck 10 having a dump body 12 and tailgate assembly 14 constructed in accordance with the teachings of the present invention is shown. The truck 10 includes a chassis 16 which is supported on a plurality of tires 17 and to which the dump body 12 is attached for pivotal movement about an axis between a lowered position (FIG. 1) for receiving and transporting a load of material and a raised position (FIG. 2) for dumping the load. In the illustrated embodiment, the dump body 12 is moved between the lowered and raised positions by actuation of a hydraulic dump cylinder 19 carried on the chassis 16 of the truck 10. The dump body 12 is generally constructed of steel panels which define the shape of the dump body and beams which form the structural framework for the dump body.

In the illustrated embodiment, the truck 10 is generally symmetrical about its longitudinal axis. Accordingly, as will be appreciated, many of the elements identified in the side views of FIGS. 1–2 have complementary elements arranged on the opposite side of the truck 10. For ease of references herein, the present invention will only be described in connection with the side of the truck shown in FIGS. 1–2. However, it will be appreciated that in one embodiment of the invention complementary elements are provided on the side of the truck that is not shown.

In this case, the dump body 12 comprises a pair of opposing sidewalls 20, a front wall 22 and a floor 24. The dump body 12 further includes a canopy 26 which is integrally connected to the top end of the front wall 22 and extends towards the cab of the truck 10. The illustrated tailgate assembly includes a pair of laterally spaced, parallel sidearms 28 between which a center-rear portion 30 of the tailgate is supported. Each sidearm 28 is pivotally connected to a respective one of the sidewalls 20 of the dump body 12 by a pivot pin 32 so as to allow the sidearms to rotate relative to the dump body 12 between a closed position (FIG. 1) and an open position (FIG. 2). In the closed position, the tailgate assembly 14 is in a lowered position with the center-rear portion 30 of the tailgate extending between the opposing sidewalls 20 and, when being loaded, closing off the rear end of the dump body 12 as shown in FIG. 1. With the rear end of the dump body 12 closed off, the volumetric capacity of the dump body is increased for more efficient hauling of material. In the open position, the center-rear portion 30 of the tailgate assembly is pivoted upward relative to the rear end of the dump body 12 so as to allow material to be dumped from the rear of the dump body 12 as shown in FIG. 2.

For rotating the tailgate assembly 14 between the closed (FIG. 1) and open (FIG. 2) positions, the tailgate assembly 14 includes an actuating assembly. The actuation assembly comprises, in this instance, a cable or chain 36 that is connected at one end to the sidearm 28 and at the opposing end to an outrigger 38 (FIG. 3) that is attached to the truck chassis 16. The chain 36 produces a torque on the tailgate assembly 14 that rotates the tailgate assembly between the closed and open positions as the hydraulic dump cylinder 19 pivots the dump body 12 between the raised and lowered positions.

In accordance with one important aspect of the present invention, the center-rear portion 30 is connected to the sidearms 28 in such a manner to substantially improve the strength and durability of the tailgate assembly 14 as compared to prior art designs. As explained above, the connections between the center-rear portion and the sidearms can be a weak point in the design of a tailgate assembly in that the nuts and bolts and/or welded joints holding the components together are subjected to a substantial amount of stress that, because of their relatively small size and/or placement, they frequently are unable to totally withstand. With the connection arrangement of the present invention, the overall strength and durability of the tailgate assembly 14 is improved by eliminating or substantially reducing the stress on the nuts and bolts and/or welded joint. With one embodiment of the present invention (e.g., FIGS. 1–7), the nuts and bolts are instead used to simply set the tailgate assembly 14 at the proper width. As a result, the width of the tailgate assembly 14 can also be adjusted much more easily with this embodiment of the invention.

Figure 3:
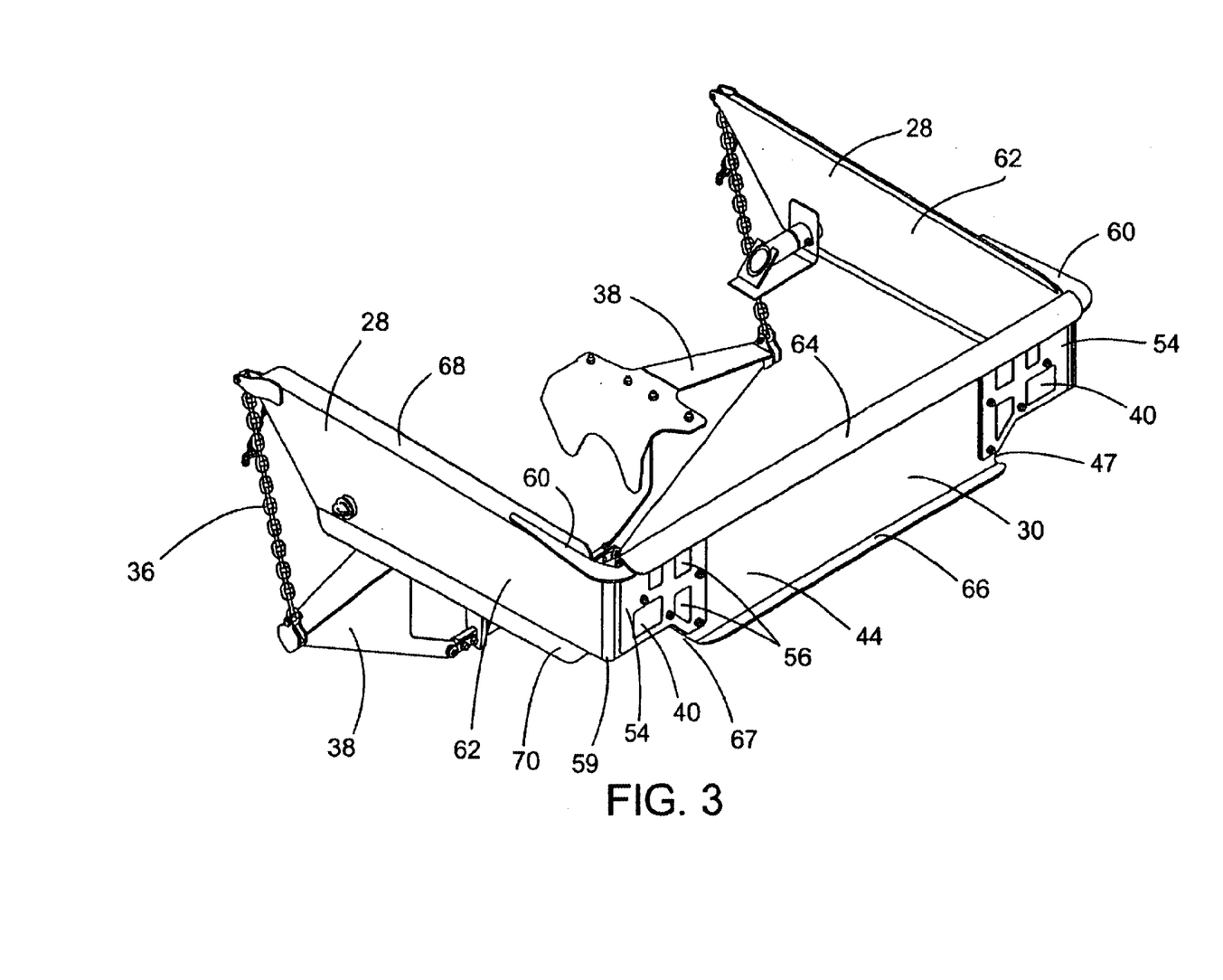
FIG. 3 is a perspective view of the tailgate assembly of FIG. 1 which also shows the tailgate outrigger/chassis attachment.
Figure 4:
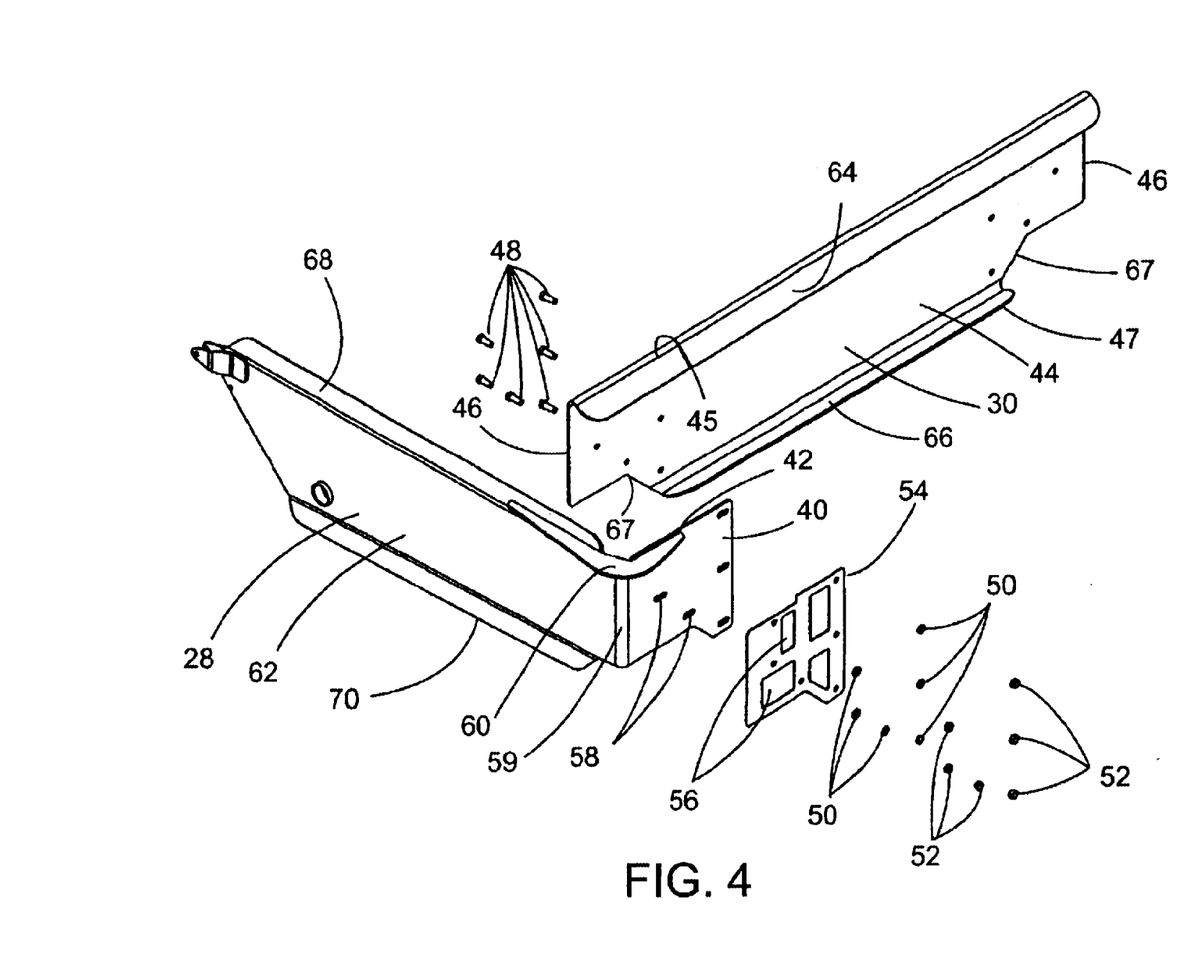
FIG. 4 is an exploded, partial perspective view of the tailgate assembly of FIG. 1.

To this end, as shown in FIGS. 3, 4, 6 and 7, an extended portion 40 is provided on the free end of each of the sidearms 28. As best shown in FIG. 4, the extended portions 40 are integral with the rest of the respective sidearm 28 so that the sidearms 28 still can have a one-piece construction. As shown in FIGS. 3, 4, 6 and 7, the extended portions 40 are bent inwardly towards each other and the center so as to define respective connection surfaces to which the center-rear portion 30 can be mounted. In particular, as best shown in FIG. 4, an inside surface 42 of each extended portion 40 defines a connection surface against which the outside surface 44 of the center-rear portion 30 abuts. The center-rear portion 30 still spans across substantially the entire width of the open rear end of the dump body 12, but the extended portions 40 overlie the outer surface 44 of the center-rear portion 30 adjacent to the ends 46 thereof. Thus, any force caused by material in the dump body 12 colliding against the inside surface 45 of the center-rear portion 30 is transmitted from the outside surface 44 of the center-rear portion directly to the inside surfaces 42 of the extended portions 40 and thereby to the sidearms 28.

As compared to conventional nut and bolt or welded connection arrangements, the extended portions 40 distribute the force over a much larger area thereby greatly decreasing the stress on the connections. As will be appreciated, the extended portions 40 should overlap the center-rear portion 30 an amount that allows for sufficient distribution of the force acting on the connections. For example, the extended portions 40 can each overlap between 7–30% of the length of the center-rear portion 30.

Since the center-rear portion 30 is arranged inside the extended ends of the sidearms 28, the lower edge 47 of the center-rear portion 30 can be arranged in closer proximity to the rear end of the dump body floor 24. This helps prevent any gap between the dump body floor 24 and the center-rear portion 30 through which material could spill.

In the illustrated embodiment, the center-rear portion 30 is secured relative to the extended portions 40 of the sidearms by bolts 48 as shown in FIG. 4. The bolts 48 extend through corresponding openings in the center-rear portion 30 and the extended portion 40 of the sidearm 28 and are secured in place by mating washers 50 and nuts 52. In this case, a washer plate 54 is provided to help facilitate the connection between each of the extended portions 40 of the sidearms 28 and the center-rear portion 30. Additionally, in this case, openings 56 are provided in the washer plate 54 to provide access for spot welding the washer plate 54 to the extended portion 40. As will be appreciated, the washer plate 54 can be used in lieu of individual flat washers. Alternatively, the individual flat washers could be used instead of the washer plate. However, neither a washer plate nor flat washers are required to secure the center-rear portion 30 to the extended portions 40 of the sidearms. Moreover, if a washer plate is provided, the openings are not required.

To allow the width of the tailgate assembly 14 to be easily adjusted, the bolt openings 58 in the extended portions 40 of the sidearms 28 can be slotted as shown in FIG. 4. These slotted bolt openings 58 allow the position of the center-rear portion 30 to be adjusted relative to the sidearms 28 in order to match the width of the open rear end of the dump body 12. Thus, there is no need to use any shims or the like, substantially easing the assembly process. As can be seen, with this embodiment, the nuts/bolts only function to secure the center-rear portion 30 in the proper position relative to the sidearms 28 and are not subjected to stress caused by loaded material in the dump body 12 colliding with the center-rear portion 30.

Figure 7:
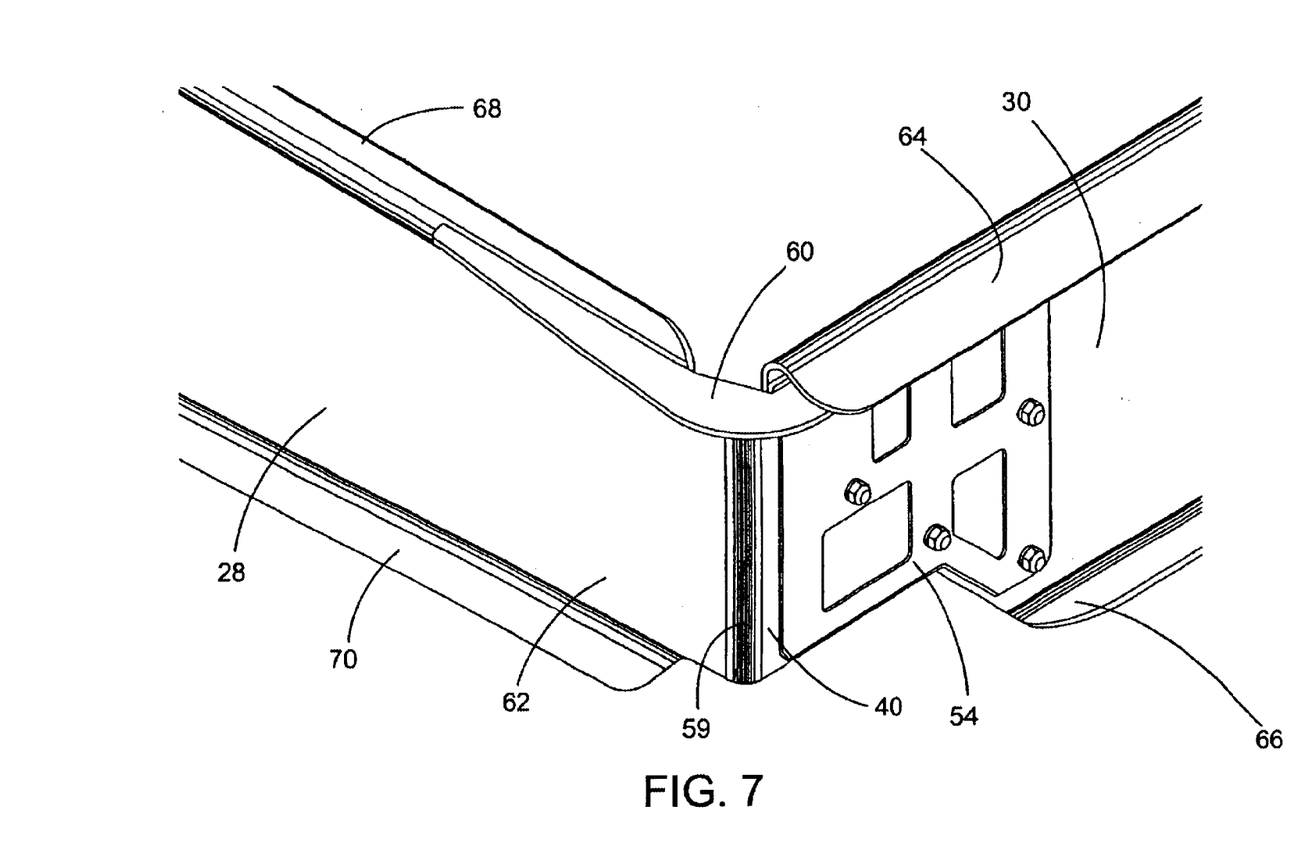
FIG. 7 is an enlarged perspective view of the connection between one of the sidearms and the center-rear portion of the tailgate assembly of FIG. 1.

To provide the curved sections 59 of the extended portions 40 of the sidearms 28 with additional strength, and in particular rigidity against bending, in this instance, one or more support flanges 60 may be attached to each sidearm 28. As shown in FIG. 7, one support flange 60 is attached, in this case, along an upper edge of each of the sidearms 28. The support flange 60 extends along the upper edge of the sidearm 28 from the main portion 62 of the sidearm through the curved section 59 and along a section of the extended portion 40. It will be appreciated that the support flange 60 can have configurations other than that shown in the drawings as well as different locations.

According to a further aspect of the present invention, the center-rear portion 30 can have a configuration that allows it to be made of a single piece without any reinforcing structures attached thereto. One of the more time consuming steps associated with manufacturing a tailgate assembly consists of welding reinforcing structures to the tailgate center-rear and sidearm portions. These reinforcing structures are needed to help prevent lateral bending of the center-rear and sidearm portions.

Figure 5:
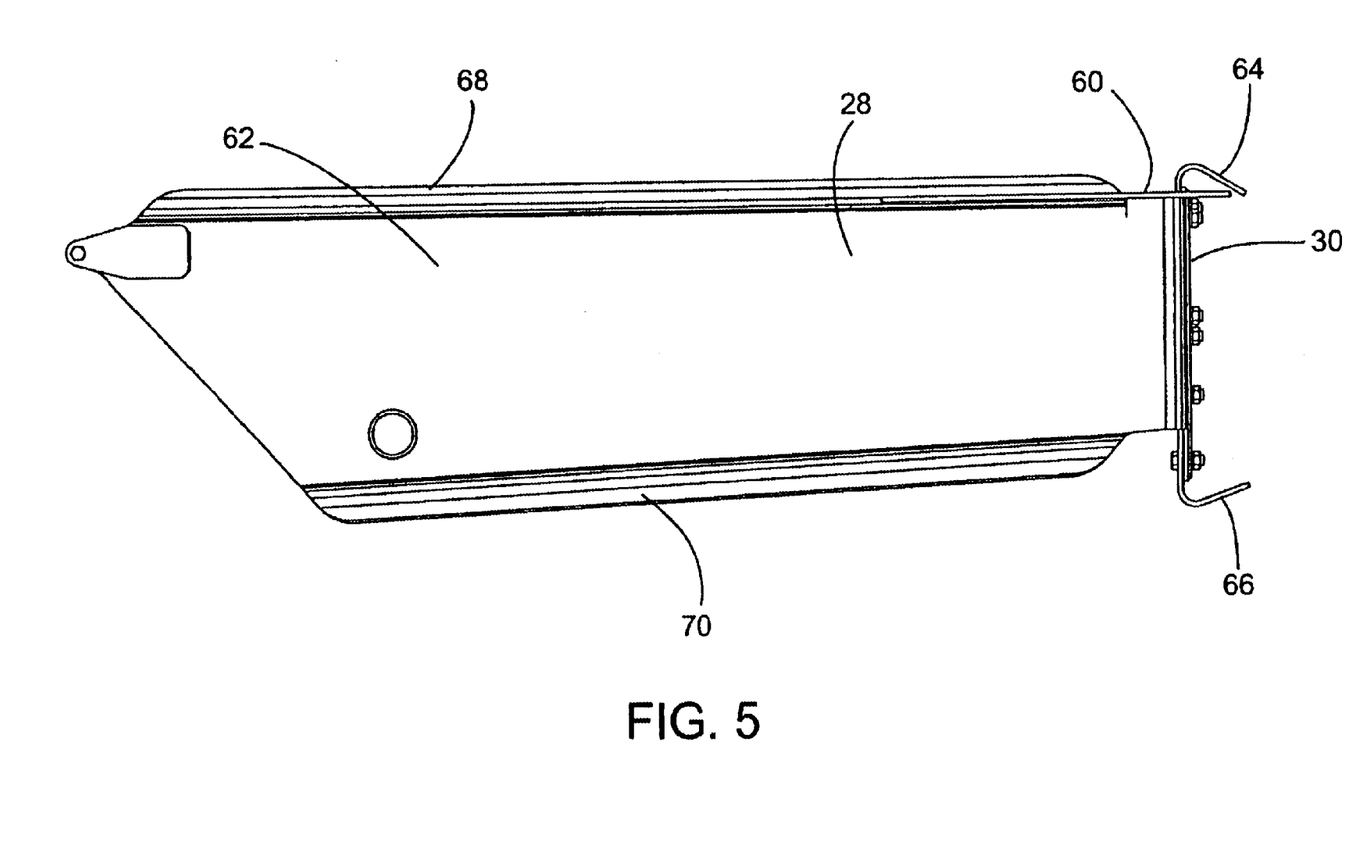
FIG. 5 is a side elevation view of the tailgate of the tailgate assembly of FIG. 1.
Figure 6:
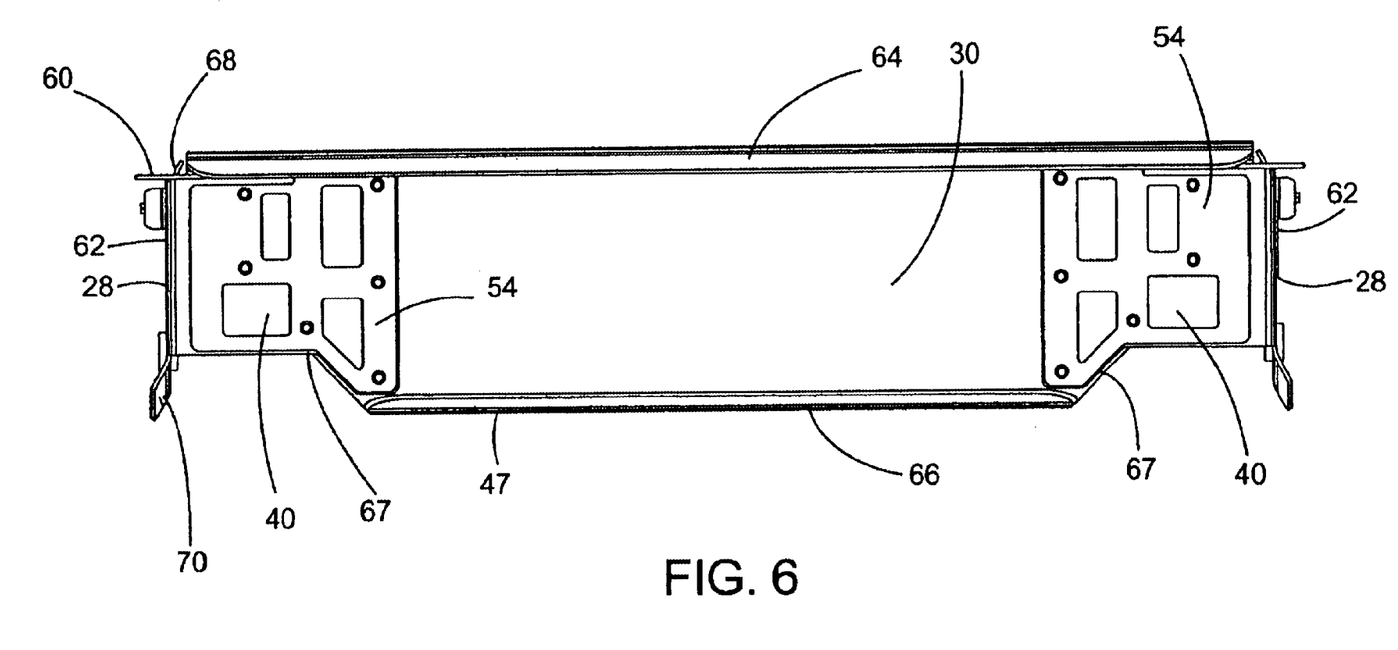
FIG. 6 is an end elevation view of the tailgate of the tailgate assembly of FIG. 1.

As best shown in FIGS. 3–6, the illustrated center-rear portion 30 has an outward bend or curl 64, 66 (i.e., away from the interior of the dump body 12) adjacent its upper edge and adjacent its lower edge. Each curl 64, 66 extends along a substantial portion of the distance between the sidearms 28. Specifically, as shown in FIGS. 3 and 6, the upper curl 64 extends across the entire upper edge of the center-rear portion 30 from the main portion 62 of one sidearm 28 to the main portion of the other sidearm. The lower curl 66 extends between respective cut-out sections 67 in the lower edge of the center-rear portion 30 such that the lower curl 66 extends approximately from the inner end of one body side wall 20 to the inner end of the other body side wall. The upper and lower curled portions 64, 66 stiffen the center-rear portion 30 against lateral bending allowing a relatively lighter weight piece of, for example, steel to be used while minimizing the need for any attached reinforcing structures. Since the curls 64, 66 can be produced in the center-rear portion 30 using a simple metal forming operation, the tailgate assembly 14 can be manufactured much more efficiently.

As shown in FIGS. 3–5, similar bends or curls 68, 70 can also be provided in the upper and lower edges of the main portions 62 of the sidearms 28 to provide further rigidity thereto. In this case, the curl 68 at the upper edge of the sidearm 28 is curled inward towards the dump body 12 while the curl 70 at the lower edge of the sidearm 28 is outward away from the dump body 12. Both the upper and lower sidearm curls 68, 70 extend along substantially the entire length of the respective main portions 62 of the sidearms 28. Again, the curls 68, 70 in the sidearms 28 can be fashioned using a simple metal forming operation. It will be appreciated that the curls 64, 66, 68, 70 in the center-rear portion 30 and in the sidearms 28 can have shapes and configurations other than that shown in the illustrated embodiment.

Figure 8:
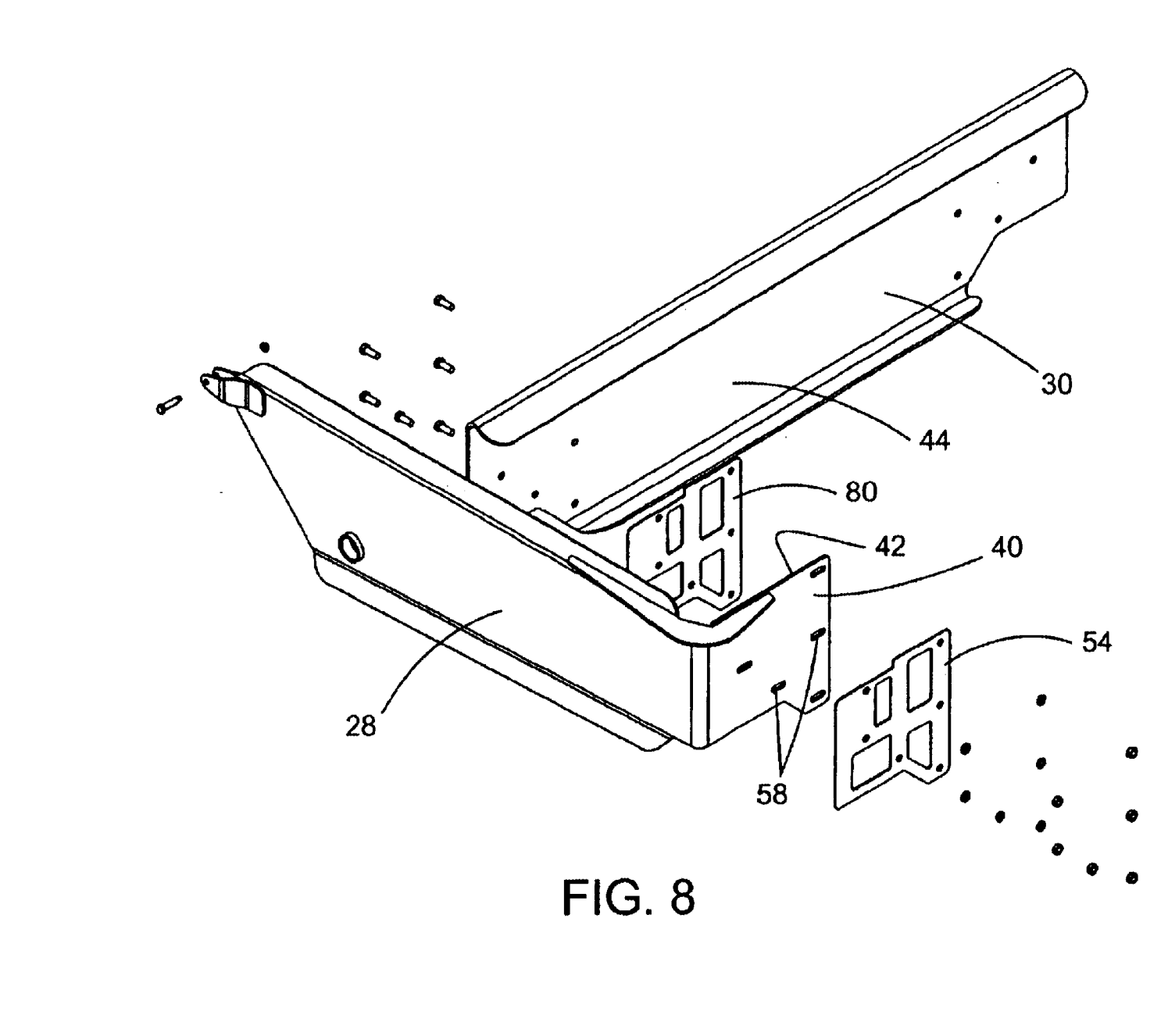
FIG. 8 is an exploded partial perspective view of an alternative embodiment of a tailgate assembly according to the present invention that includes a spacer plate.

A further embodiment of the present invention is shown in FIG. 8. In this embodiment, a spacer plate 80 is arranged between the outside surface 44 of the center rear portion 30 and the inside surface 42 of each of the sidearm extended portions 40 (only one of which is shown in FIG. 8). The spacer plates 80 allow the position of the center rear portion 30 to be adjusted inward (i.e., toward the interior of the body) or forward (i.e., toward the forward end of the truck) as desired. Alternatively, washers could be used instead of the spacer plate 80.

Figure 9:
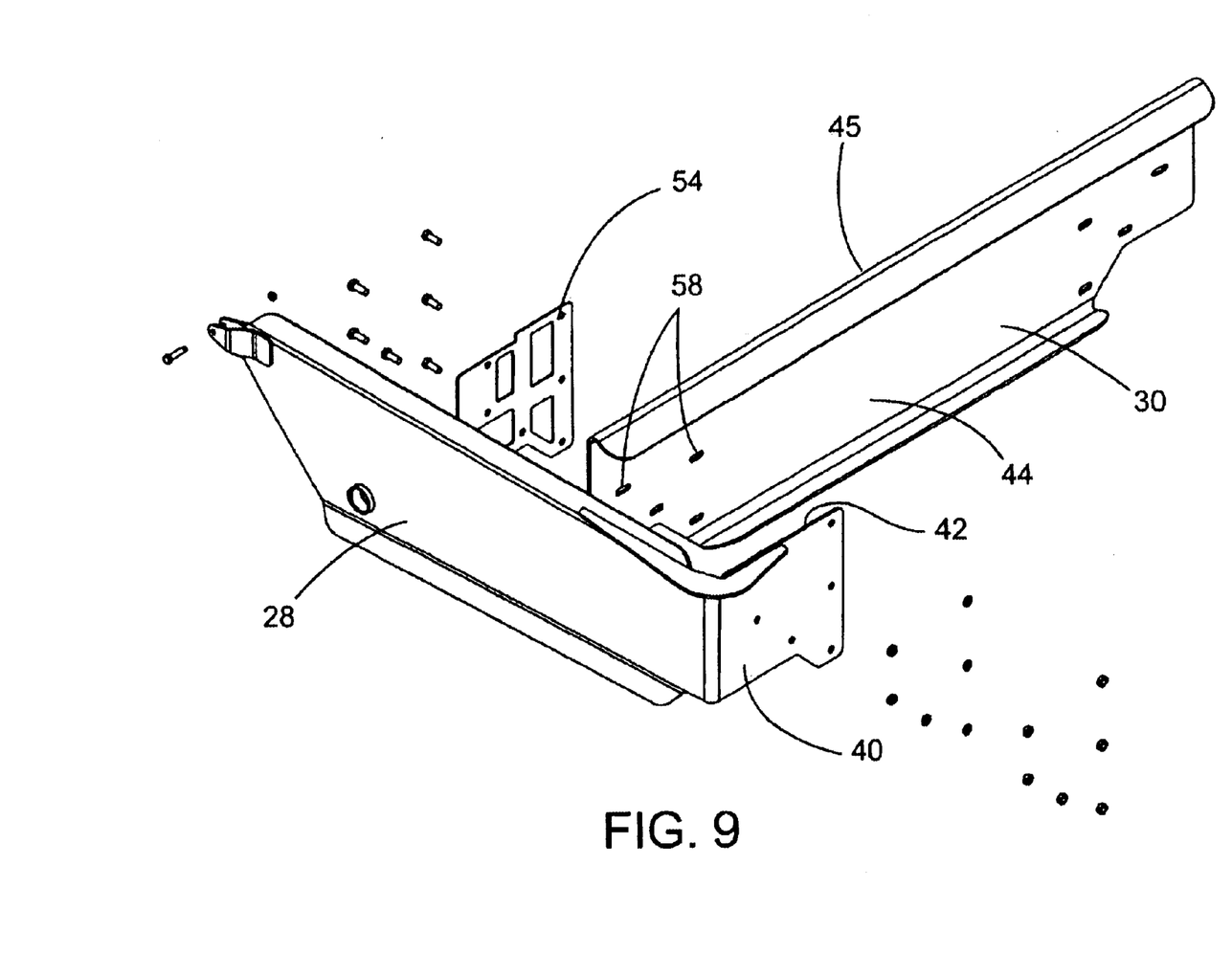
FIG. 9 is an exploded partial perspective view of an alternative embodiment of a tailgate assembly according to the present invention that has slotted bolt openings in the center rear portion.
Figure 10:
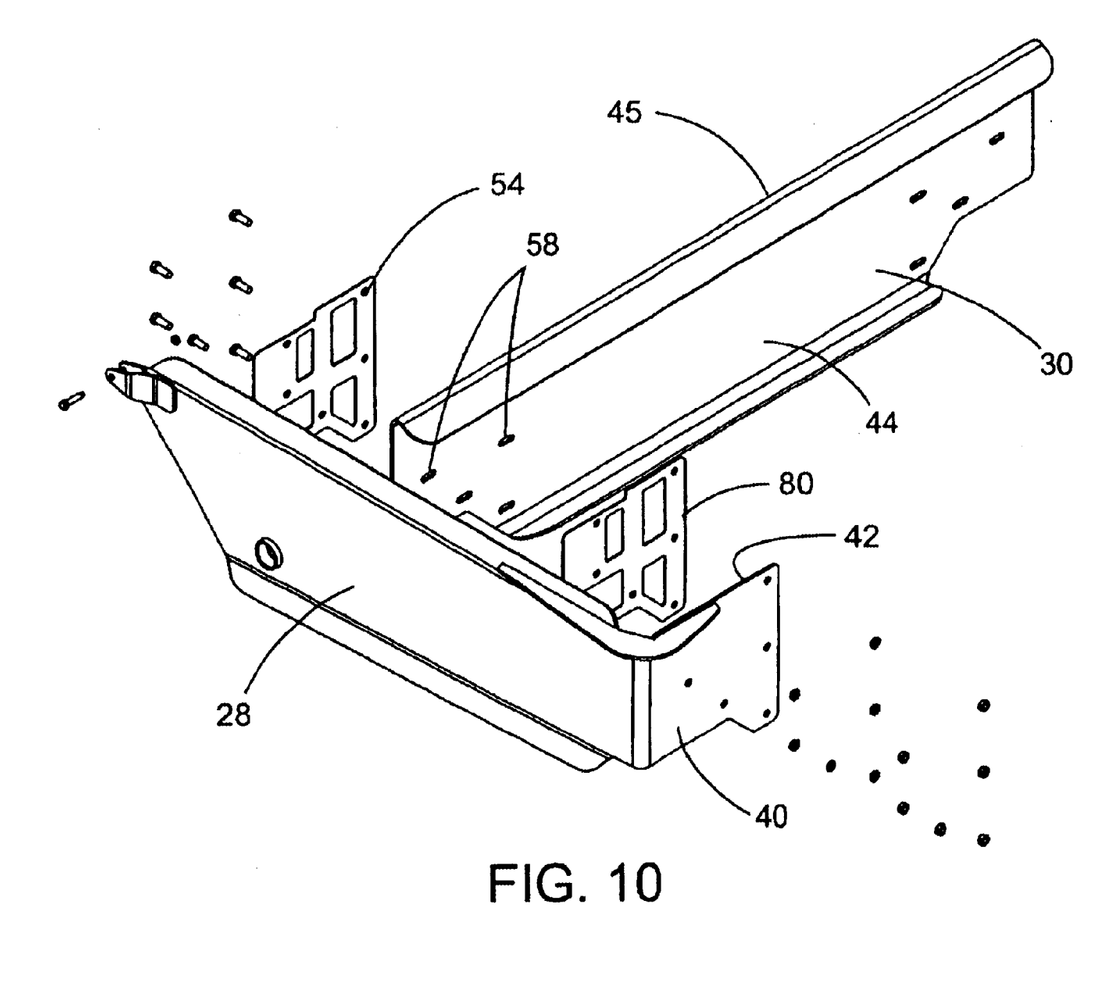
FIG. 10 is an exploded partial perspective view of the tailgate assembly of FIG. 9 with the addition of a spacer plate.

As illustrated in FIG. 9, the slotted bolt openings 58 that allow for adjustment of the width of the tailgate assembly 14 could be provided in the center rear portion 30 as opposed to in the sidearm extended portions 40. In this case, since the slotted openings 58 are provided in the center rear portion 30, the washer plates 54 (one of which is shown in FIG. 9) are arranged abutting the inside surface 45 of the center rear portion 30. Like the embodiment shown in FIG. 8, a spacer plate 80 (or alternatively washers) could be provided between the outside surface 44 of the center rear portion 30 and the inside surface 42 of each of the sidearm extended portions 40 as shown in FIG. 10 (only one sidearm 28 is shown) in order to adjust the position of the center rear portion 30 inward or forward.

Figure 11:
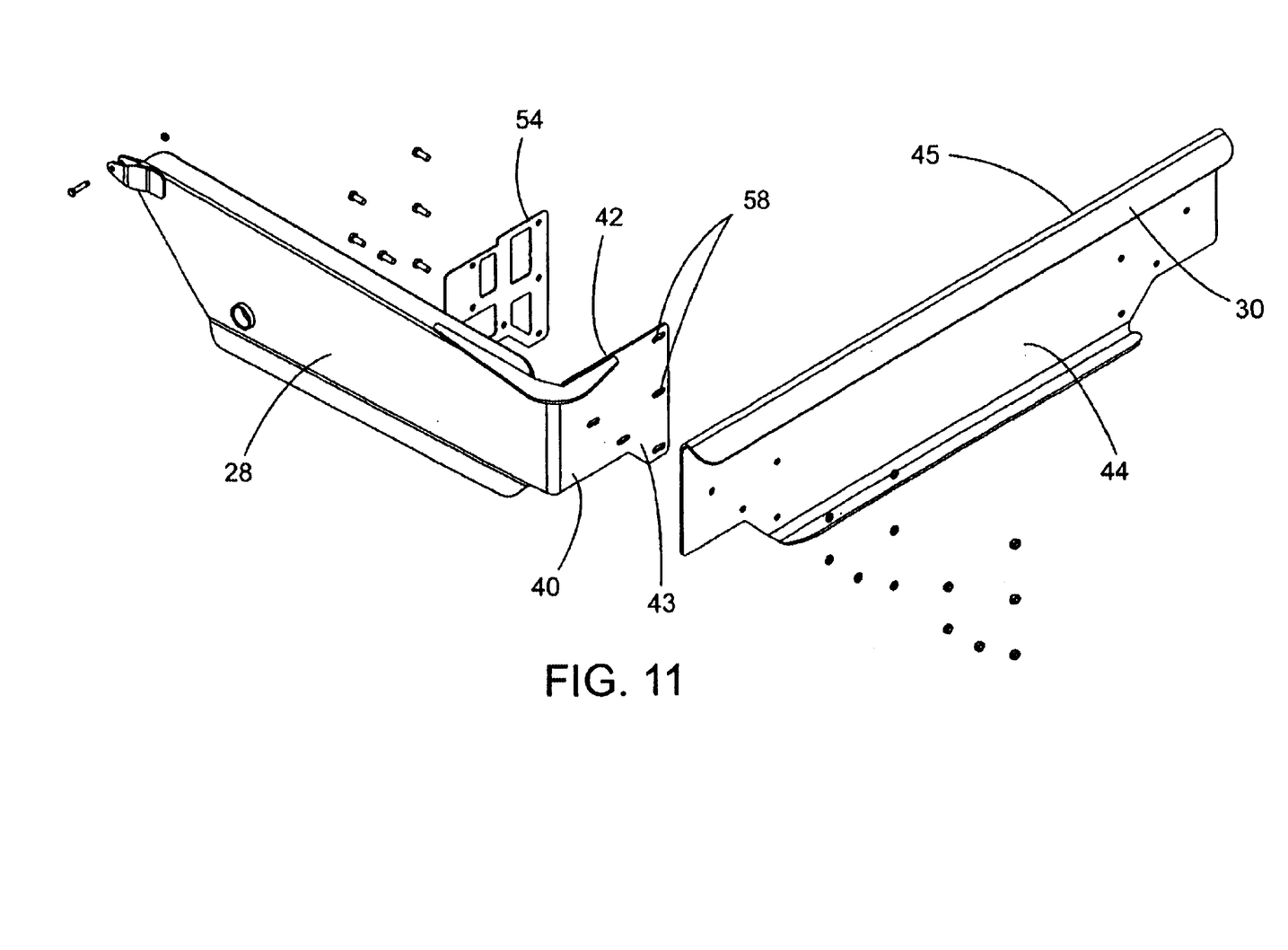
FIG. 11 is an exploded partial perspective view of an alternative embodiment of a tailgate assembly according to the present invention in which the sidearms are fastened to an inside surface of the center rear portion.
Figure 12:
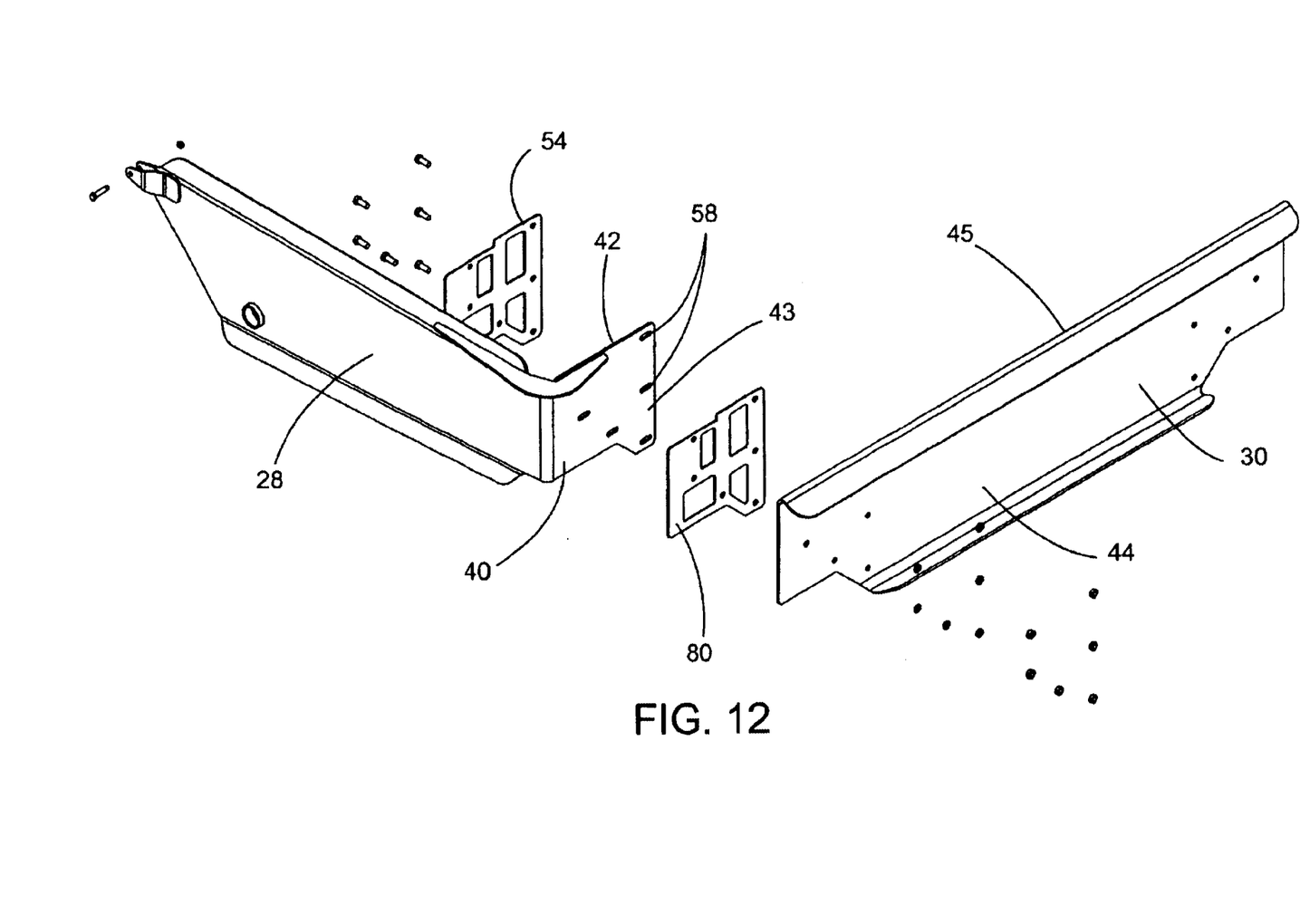
FIG. 12 is an exploded partial perspective view of the tailgate assembly of FIG. 11 with the addition of a spacer plate.
Figure 13:
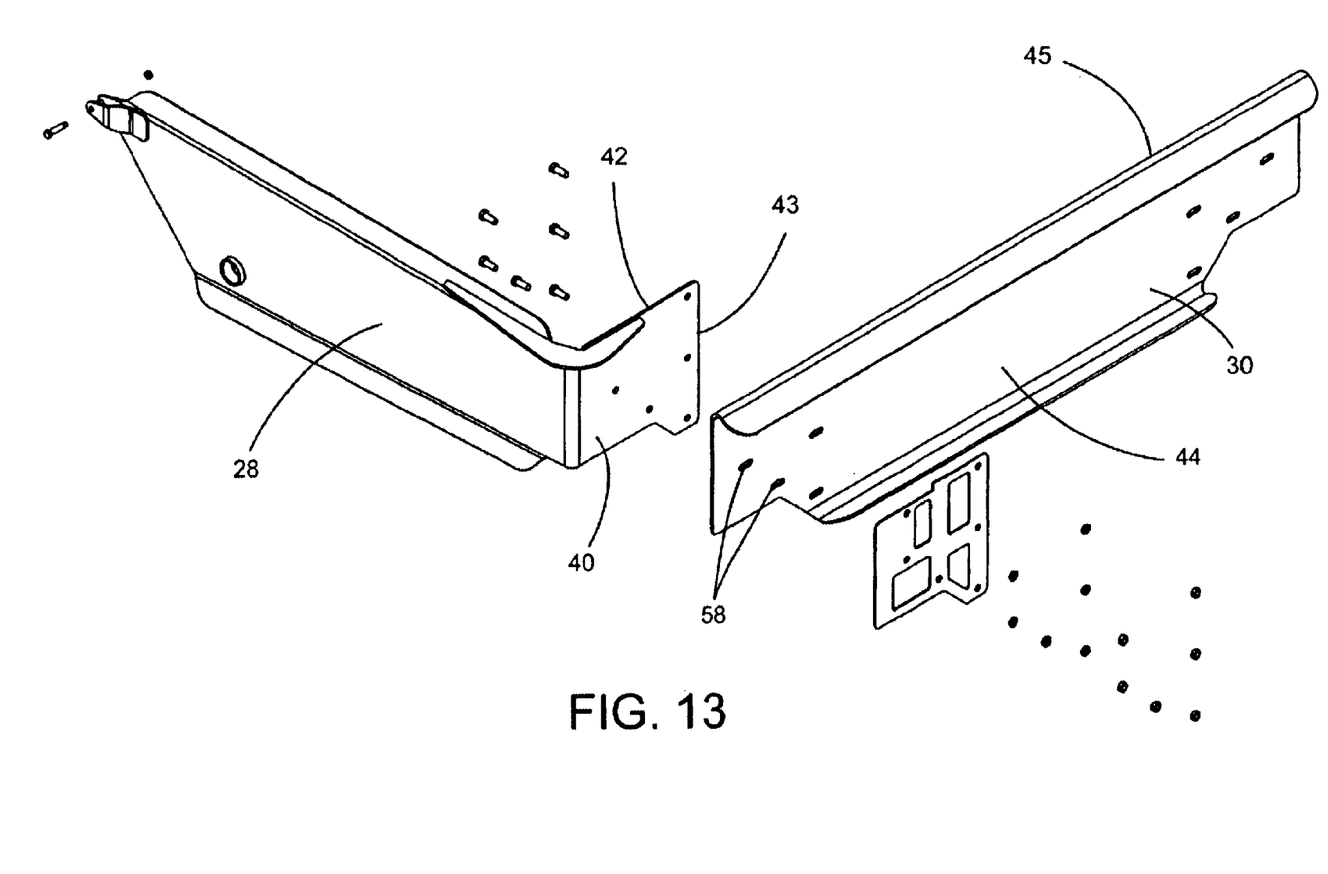
FIG. 13 is an exploded partial perspective view of an alternative embodiment of a tailgate assembly according to the present invention in which the sidearms are fastened to an inside surface of the center rear portion and slotted bolt openings are provided in the center rear portion.
Figure 14:
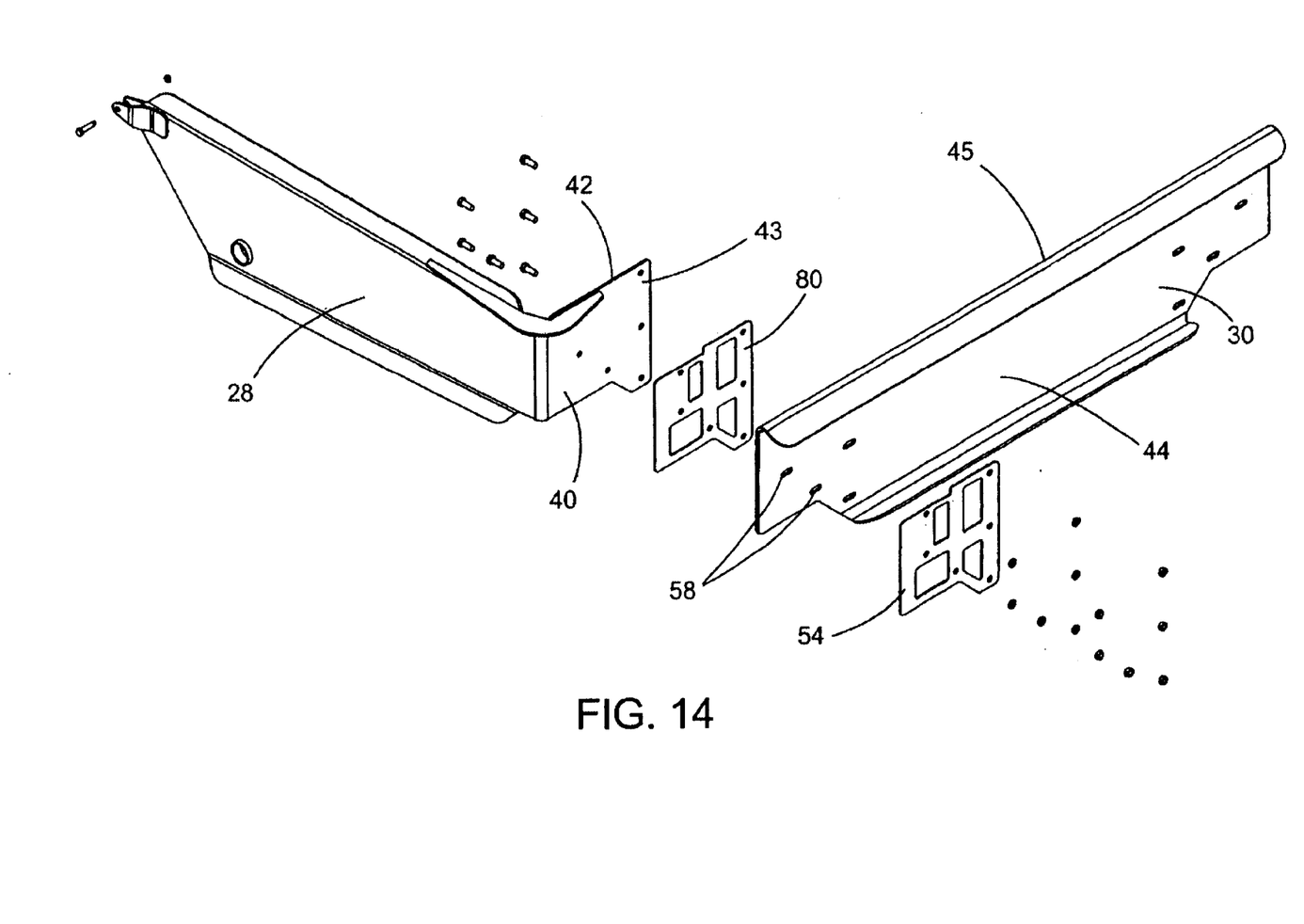
FIG. 14 is an exploded partial perspective view of the tailgate assembly according to FIG. 13 with the addition of a spacer plate.

As opposed to fastening the sidearm extended portions 40 to the outside surface 44 of the center rear portion 30, the relative positions of the sidearm extended portions 40 and center rear portion 30 could be reversed. In particular, as shown in FIG. 11, the sidearm extended portions 40 and the center rear portion 30 could be arranged such that each sidearm extended portion 40 is fastened to the inside surface 45 of the center rear portion 30, i.e. with a portion of the outside surface 43 of each sidearm extended portion 40 facing a portion of the inside surface 45 of the center rear portion 30 (only one sidearm is shown in FIG. 11). In the embodiment of FIG. 11, the slotted bolt openings 58 are provided in the sidearm extended portions 40 and thus, each washer plate 54 (one of which is shown) is secured to the inside surface 42 of the respective sidearm extended portion 40. Alternatively, the slotted bolt openings 58 could be provided in the center rear portion 30 with the washer plates 54 arranged on the outside surface 44 of the center rear portion 30 as shown in FIG. 13 (only one sidearm is shown). In order to adjust the position of the center rear portion 30 outward or rearward, a spacer plate 80 could be arranged between the outside surface 43 of each of the sidearm extended portions 40 and the inside surface 45 of the center rear portion 30 as shown in FIG. 12 (slotted openings 58 in the sidearm extended portions 40) and FIG. 14 (slotted openings 58 in the center rear portion 30).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Of course, variations of those preferred embodiments will become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tailgate assembly for a dump body, the dump body having a pair of opposing sidewalls and an open rear end, the dump body being movable relative to a chassis between a lowered transport position and a raised dump position, the tailgate assembly comprising:

a pair of opposing sidearms each of which is pivotally connected to a respective sidewall of the dump body and a center-rear portion supported between the opposing sidearms, the sidearms and center-rear portion being movable between a closed position wherein the center-rear portion spans substantially between the opposing sidewalls of the dump body and encloses the open rear end of the dump body and an open position wherein the center-rear portion is positioned away from the open rear end of the dump body, the center-rear portion having an inside surface which faces an interior of the dump body and an opposing outside surface which faces away from the interior of the dump body, and wherein each of the sidearms includes an extended portion at an end thereof, the extended portions being curved inwardly toward each other in overlapping relation to at least a portion of the center-rear portion and each extended portion being fastened to the center-rear portion.

2. The tailgate assembly of claim 1 further including an actuating assembly for moving the sidearms and center-rear portion between the closed and open positions as the dump body moves between the lowered, transport position and the raised, dump position.

3. The tailgate assembly of claim 2 wherein the actuating assembly includes a link having a first end connected to one of the sidearms and a second end that is connectable to the chassis.

4. The tailgate assembly of claim 1 wherein a support flange is arranged on at least one of the sidearms so as to extend around the curve of the respective extended portion.

5. The tailgate assembly of claim 4 wherein the support flange is arranged on an edge of the sidearm.

6. The tailgate assembly of claim 1 wherein each extended portion is connected to the center-rear portion by at least one respective bolt which extends through corresponding openings in the center-rear portion and the respective extended portion.

7. The tailgate assembly of claim 6 wherein the opening in either the center-rear portion or the respective end portion is slotted so as to allow the position of the center-rear portion to be adjusted relative to the sidearms.

8. The tailgate assembly of claim 1 wherein the center-rear portion has upper and lower edges extending between the sidearms, the center-rear portion being curled adjacent the upper edge and adjacent the lower edge with each curl extending along a substantial portion of the distance between the sidearms so as to make the center-rear portion more resistant to lateral bending.

9. The tailgate assembly of claim 8 wherein the center-rear portion does not have any structures attached thereto for reinforcing the center-rear portion against lateral bending.

10. The tailgate assembly according to claim 8 wherein the curls are away from the interior of the dump body.

11. The tailgate assembly of claim 1 wherein the center rear portion has a curl along an edge thereof which extends a substantial portion of the distance between the sidearms.

12. The tailgate assembly of claim 11 wherein the center rear portion has a curl along both an upper and a lower edge thereof each of which extends a substantial portion of the distance between the sidearms.

13. The tailgate assembly of claim 1 wherein at least one of the sidearms has a curl along an edge thereof.

14. The tailgate assembly of claim 13 wherein the sidearm has curls along both an upper and a lower edge thereof.

15. The tailgate assembly of claim 14 wherein both sidearms have curls along both an upper and a lower edge thereof.

16. The tailgate assembly of claim 14 wherein one of the curls extends towards the dump body and the other curl extends away from the dump body.

17. The tailgate assembly of claim 1 wherein each of the extended portions is arranged inward of the center-rear portion.

18. The tailgate assembly of claim 17 wherein a spacer plate is arranged between each extended portion and the center rear portion.

19. The tailgate assembly of claim 1 wherein each of the extended portions is arranged outward of the center-rear portion.

20. The tailgate assembly of claim 19 wherein a spacer plate is arranged between each extended portion and the center rear portion.

21. The tailgate assembly of claim 1 wherein the extended portions overlap the outside surface of the center rear portion.

* * * * *